United States Patent [19]

Matsumoto

[11] Patent Number: 4,901,680
[45] Date of Patent: Feb. 20, 1990

[54] INTAKE SYSTEM FOR ENGINES

[75] Inventor: Hiromitsu Matsumoto, Hamamatsu, Japan

[73] Assignee: Yamaha Hatsudoki Kabushiki Kaisha, Iwata, Japan

[21] Appl. No.: 649,141

[22] Filed: Sep. 6, 1984

Related Application Data

[63] Continuation of Ser. No. 175,834, Aug. 6, 1980, abandoned.

[30] Foreign Application Priority Data

Aug. 9, 1979 [JP] Japan ................................. 54-101546

[51] Int. Cl.$^4$ ........................................... F02M 35/10
[52] U.S. Cl. ............................... 123/52 MB; 123/308; 123/590
[58] Field of Search ......... 123/52 M, 52 MB, 52 MC, 123/308, 432, 188 M, 198 E, 590; 181/182, 184, 214

[56] References Cited

U.S. PATENT DOCUMENTS

| | | | |
|---|---|---|---|
| 2,014,371 | 9/1935 | Barker | 123/52 M |
| 3,664,316 | 5/1972 | Garcea | 123/52 MB X |
| 3,875,918 | 4/1975 | Loynd | 123/52 M |
| 4,180,042 | 12/1979 | Lloyd | 123/590 |
| 4,231,329 | 11/1980 | Ishida | 123/52 MB |
| 4,243,001 | 1/1981 | Yamada | 123/432 |
| 4,244,333 | 1/1981 | Matsumoto | 123/432 |
| 4,271,801 | 6/1981 | Yamakawa et al. | 123/432 |
| 4,271,803 | 6/1981 | Nakanishi et al. | 123/308 |

FOREIGN PATENT DOCUMENTS 0060317 5/1977 Japan ................................. 123/432

Primary Examiner—Willis R. Wolfe
Attorney, Agent, or Firm—Ernest A. Beutler

[57] ABSTRACT

An induction system for an internal combustion engine that has, in addition to the conventional main intake passage, a relatively small cross-sectional auxiliary intake passage which discharges into the main intake passage upstream of the point of communication of the main intake passage with the engine chamber and downstream of the throttle valve of the engine. A relatively large capacity plenum chamber feeds the auxiliary intake passage so that on the intake cycle a high velocity charge will be delivered from the auxiliary intake passage into the chamber to increase turbulence and improve the combustion efficiency.

12 Claims, 1 Drawing Sheet

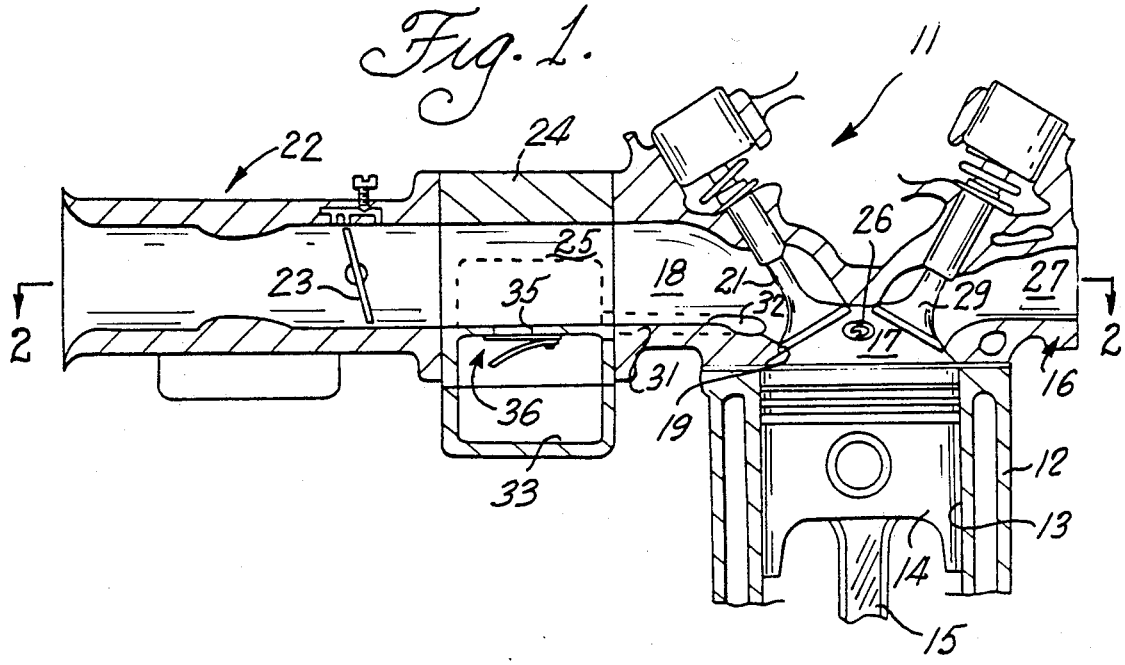
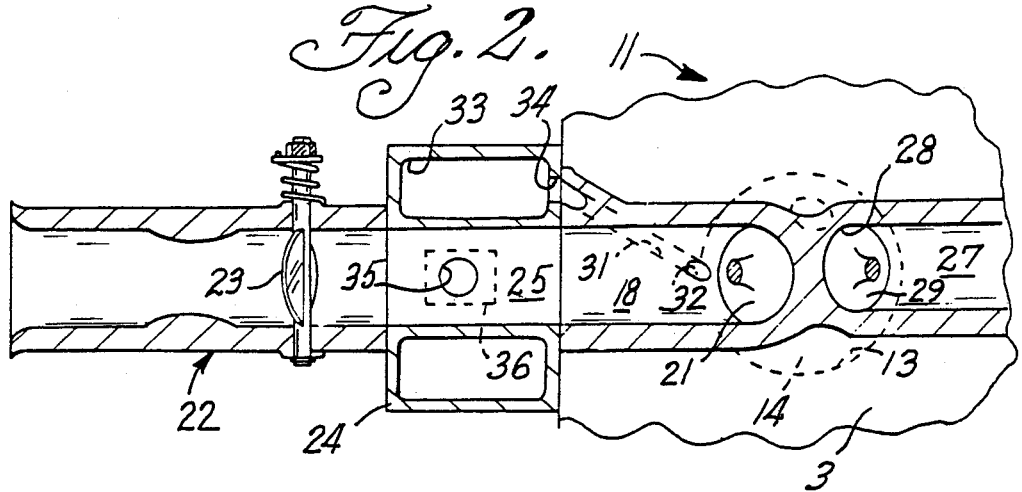

4,901,680

INTAKE SYSTEM FOR ENGINES

This application is a continuation of application Ser. No. 175,834 filed Aug. 6, 1980, now abandoned.

BACKGROUND OF THE INVENTION

This invention relates to an intake system for an engine, and more particularly to an improved intake system that improves engine running and combustion efficiency.

It is known that the efficiency of an engine is not particularly good at idle and at low and mid-range running. The reason for the reduced efficiency and increased exhaust gas emissions is the slow combustion which occurs under these running conditions. It has been proposed to improve the combustion of an engine by increasing the turbulence in the combustion chamber, particularly at these lower speed and power ranges. One manner in which such turbulence has been generated is through the use of an auxiliary intake passage which delivers a charge to the engine chambers under these running conditions at a high velocity. Such a high velocity intake charge increases the turbulence and accordingly the rate of flame propagation to improve efficiency and reduce the emission of unwanted exhaust gas constituents.

It is, therefore, a principal object of this invention so as to provide an induction system for an internal combustion engine which increases turbulence and improves engine operating efficiency.

It is another object of this invention to provide an improved and simplified induction system for an engine including a small auxiliary intake passage.

SUMMARY OF THE INVENTION

This invention is adapted to be embodied in an induction system for an internal combustion engine having a chamber of variable volume in which combustion occurs, a main intake passage communicating with the chamber through a main intake port for delivering a charge thereto and throttle valve means in the main intake passage for controlling the flow. An auxiliary intake passage is also provided which communicates at one of its ends with the main intake passage between the throttle valve means and the main intake port. The auxiliary intake passage has an effective cross-sectional area substantially less than that of the main intake passage. In conjunction with this feature of the invention, a plenum chamber is provided which is in communication with the other end of the auxiliary intake passage and which has a volume at least one quarter of the volume in the main intake passage between the throttle valve means and the main intake port.

BRIEF DESCRIPTION OF THE DRAWINGS

FIG. 1 is a partial cross-sectional view taken through a cylinder of an internal combustion engine constructed in accordance with an embodiment of this invention.

FIG. 2 is a cross-sectional view taken generally along the line 2—2 of FIG. 1.

DETAILED DESCRIPTION OF THE PREFERRED EMBODIMENT

In the drawings the reference numeral 11 indicates generally an internal combustion engine constructed in accordance with an embodiment of this invention. Only one cylinder and the intake system associated with it has been illustrated, however, it is to be understood that the invention has equal application to multi-cylinder engines. In addition, even through a reciprocating engine is illustrated, it is to be understood that the invention is susceptible of use in rotary engines as well as engines of either the two or four-stroke type.

The engine 11 includes a cylinder block 12 in which a cylinder bore 13 is formed. A piston 14 is supported for reciprocation in the cylinder bore 13 and is connected to a crankshaft (not shown) by means of a connecting rod 15. A cylinder head, indicated generally by the reference numeral 16, is affixed to the cylinder block 12 in any known manner and has a cavity 17 which cooperates with the piston 14 and cylinder bore 13 to form a chamber of volume which varies as the piston 14 reciprocates in the cylinder bore 13. The cavity 17 will at times be referred to as the combustion chamber of the engine.

One side of the cylinder head 11 is formed with a main intake passage 18 which serves a chamber 17 through a main intake port 19. An intake valve 21 controls the flow through the port 19 and is operated in any known manner. A charge is delivered to the main intake passage 18 from a carburetor indicated generally by the reference numeral 22, which may be of any known type and which includes a manually positioned throttle valve 23. The carburetor 22 discharges into a spacer 24 that is interposed between the carburetor 22 and the cylinder head 16. A main intake passage 25 is formed in the spacer 24 and which communicates with the intake passage of the carburetor 23 and the cylinder head main intake passage 18.

A spark plug 26 is supported in the cylinder head 16 and communicates with the chamber 17 for firing a charge in a chamber at the appropriate time.

An exhaust passage 27 is formed in the side of the cylinder head 16 opposite to the main intake passage 18. The exhaust passage 27 communicates with the chamber 17 through an exhaust port 28 and the flow of exhaust gases is controlled by an exhaust valve 29 which is operated in any suitable manner.

The engine thus far described is conventional and for that reason further details of its construction and operation have not been deemed necessary. In order to improve the combustion efficiency of the engine 11, particularly at low engine speeds and loads, an auxiliary intake system including a cylinder head auxiliary intake passage 31 is provided. The auxiliary intake passage 31 terminates with an auxiliary intake port 32 which discharges into the main intake passage 18 closely adjacent the intake valve 21. The passage 31 and port 32 are oriented relative to the cylinder bore 13 so as to introduce a swirl to the intake charge delivered to the chamber 17 through the auxiliary induction system. In addition, the effective cross-sectional area of the auxiliary intake system is relatively small in relation to that of the main intake passage 18 so that a given mass flow of charge delivered to the chamber 17 through the auxiliary intake system will flow at a substantially higher velocity than the same charge would through the main intake system. In a preferred embodiment of this invention, the effective cross-sectional area of the auxiliary intake passage is smaller than one fifth of that of the main intake passage.

At its upstream end, the cylinder head auxiliary intake passage 31 communicates with a plenum chamber 33 formed in the spacer 24 around its main intake passage 25. This communication is achieved via a restricted opening 34. Because of the large volume of the plenum chamber 33, a charge will be supplied to the auxiliary intake passage 31 which is sufficient to permit flow through the entire intake cycle. Thus, the degree of turbulence induced will be maintained during the entire intake stroke. Preferably, the plenum chamber 33 should have a volume at least equal to or greater than one quarter of the volume of the main intake passage between the throttle valve 23 and the port 19 and as much as three times the volume. The smaller the ratio, the less will be the effect of the turbulence generated by the auxiliary intake system.

The plenum chamber 33 is charged from the main intake passage via an inlet port 35 and a reed-type check valve 36. The check valve 36 permits the plenum 33 to be charged from the main intake passage and particularly from the spacer passage 25 but will prevent reverse flow.

In operation, when the intake valve 21 opens during the intake stroke of the piston 14, a charge will be delivered to the chamber 17 through the main induction system and also through the auxiliary induction system. As has been previously noted, the delivery of the charge from the auxiliary induction system, and specifically from the auxiliary intake port 32, will enter the chamber 17 at a high velocity and in a tangential direction so as to create turbulence and swirl in the chamber 17 which promotes rapid flame propagation when the spark plug 26 is fired. The charge delivered from the auxiliary induction system will flow from the plenum chamber 33, which has been filled during the preceding intake cycle, as will become apparent.

As the charge in the plenum 33 becomes depleted, the check valve 36 will open and permit replenishing of the volume of the plenum chamber 33 from the main intake passage and specifically from the spacer passage 25. The charge delivered to the plenum chamber 33 will consist of a carburated fuel air mixture which has been delivered by the carburetor 22. Therefore, there will be no disparity in mixture strength regardless of whether the charge is delivered to the chamber 17 from either the main or auxiliary induction systems.

It should be readily apparent from the foregoing description that an extremely effective method and structure has been provided for increasing the turbulence of the intake charge and, accordingly, the engine combustion process. These results have been achieved through a relatively simple structure which is compact and lends itself to use in engines of small size and with short induction tracts. It is also to be understood that various the foregoing description is only that of a preferred embodiment of the invention and that various changes and modifications may be made without departing from the spirit and scope of the invention, as defined by the appended claims.

I claim:

1. In an intake system for an internal combustion engine of a type having a combustion chamber, an intake passage and an exhaust passage opening to the combustion chamber, and an intake valve and an exhaust valve disposed in said intake and exhaust passages to open and close the respective passages, said intake valve having a longitudinal axis and a peripheral edge, the improvement comprising a closed supply chamber of a predetermined volume, and control passage means connected at one end to the supply chamber and being open at another end to a lower surface of the intake passage upstream of and in the immediate vicinity of the intake valve and being substantially directed at an angle offset from the longitudinal axis of the intake valve to a juncture formed upstream of the intake valve where the peripheral edge of the intake valve meets the intake passage, and the mixture in the supply chamber is fed to the combustion chamber through the control passage means upon opening of the intake valve.

2. An intake system for an internal combustion engine as claimed in claim 1 wherein said internal combustion engine is a four-stroke cycle engine.

3. An intake system for an internal combustion engine as claimed in claim 2 wherein said control passage means opens to said intake passage at a portion of the latter at the upstream side of said intake valve.

4. An intake system for an internal combustion engine as claimed in claim 1 wherein said control passage means comprises a single control passage.

5. An intake system for an internal combustion engine as claimed in claim 4 wherein said internal combustion engine is a four-stroke cycle engine.

6. An intake system for internal combustion engine as claimed in claim 4 wherein said control passage means opens to said intake passage at a portion of the latter at the upstream side of said intake valve.

7. An intake system for an internal combustion engine as claimed in claim 1 wherein said control passage means is directed in an offset direction from the center of said combustion chamber.

8. An intake system for an internal combustion engine as claimed in claim 7 wherein said internal combustion engine is a four-stroke cycle engine.

9. An intake system for an internal combustion engine as claimed in claim 8 wherein said control passage means opens to said intake passage at a portion of the latter at the upstream side of said intake valve.

10. An intake system for an internal combustion engine as claimed in claim 7 wherein said control passage means comprises a single control passage.

11. An intake system for an internal combustion engine as claimed in claim 10 wherein said internal combustion engine is a four-stroke cycle engine.

12. An intake system for internal combustion engine as claimed in claim 10 wherein said control passage means opens to said intake passage at a portion of the latter at the upstream side of said intake valve.

* * * * *